Aug. 25, 1925.
R. STEARNS
1,551,341
SHIP PROPULSION
Filed July 26, 1923
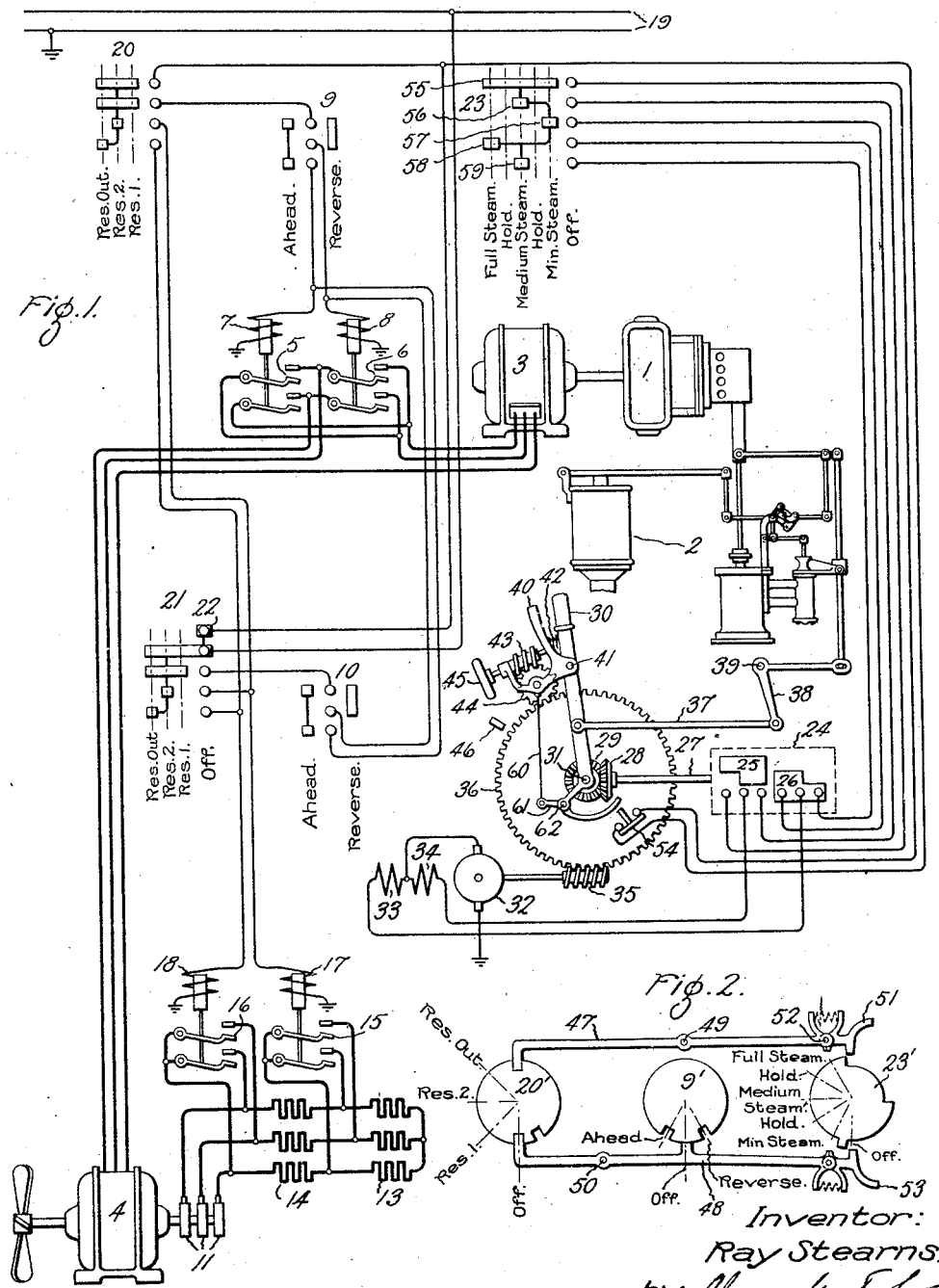
Inventor:
Ray Stearns,
by Alexander S. ___
His Attorney.

Patented Aug. 25, 1925.

1,551,341

UNITED STATES PATENT OFFICE.

RAY STEARNS, OF SCHENECTADY, NEW YORK, ASSIGNOR TO GENERAL ELECTRIC COMPANY, A CORPORATION OF NEW YORK.

SHIP PROPULSION.

Application filed July 26, 1923. Serial No. 654,037.

*To all whom it may concern:*

Be it known that I, RAY STEARNS, a citizen of the United States, residing at Schenectady, in the county of Schenectady, State of New York, have invented certain new and useful Improvements in Ship Propulsion, of which the following is a specification.

My invention relates to systems of electric ship propulsion and has for its object the provision of means whereby the operation of the ship may be controlled from different locations in a simple and reliable manner.

In controlling the operation of a ship it is desirable that both the condition of the propulsive equipment and conditions external to the vessel be taken into consideration. Control from the engine room is advantageous in that the electrical equipment is under the direct observation of the operator who may take measures to protect it in case of emergency but is objectionable in that maneuvering orders must be communicated from the bridge or pilot house from whence conditions external to the vessel may be readily observed, thus involving a certain amount of delay between the giving of a command and its execution and increasing the liability of mistakes. Control from the pilot house, on the other hand, is objectionable because of the fact that the operator must depend largely on indicating instruments for his knowledge regarding the condition of the equipment and may fail or be unable to take proper measures to protect the apparatus in case of an emergency. I propose to provide a system of control which makes it possible to control the operation of the ship from the pilot house or any other desired location under normal operating conditions but which also provides for control from the engine room in case of emergency, the arrangement being such that the pilot house control equipment is rendered inoperative when control from the engine room is initiated.

My invention will be better understood on reference to the following description taken in connection with the accompanying drawing and its scope will be pointed out in the appended claims.

Referring now to the drawing; Fig. 1 shows a system of ship propulsion in which my invention has been embodied; and Fig. 2 shows an arrangement for interlocking the various controllers by which the operation of the system is regulated.

Fig. 1 shows a steam turbine 1 provided with a governor 2 and adapted to drive an alternating current generator 3 arranged to supply current to a propeller motor 4 through reversing switches 5 and 6 which are provided with operating coils 7 and 8 the connections of which may be controlled either by a controller 9 located in the pilot house or by a controller 10 located in the engine room. Suitable means are provided for controlling the speed torque characteristic of the motor, this means being illustrated as a secondary resistor connected to the slip rings 11 and having sections 13 and 14 adapted to be successively short circuited by switches 15 and 16 arranged to be operated in response to energization of coils 17 and 18 respectively, the connections of which to the source of current 19 may be regulated either by controller 20 in the pilot house or by the controller 21 in the engine room. A segment 22 is provided on the controller 21 for disconnecting the controller 20 from the source of current 19 when the controller 21 is moved from the "Off" position.

A controller 23 is provided in the pilot house for regulating the operation of the governor 2 the setting of which determines the amount of steam admitted to the turbine 1. Cooperatively associated with the controller 23 is a follow-up device 24 provided with conductive segments 25 and 26 arranged to rotate with a shaft 27 upon which is mounted a gear 28 adapted to mesh with a gear 29 fixed to the lever 30 mounted upon a shaft 31. The following device 24 is arranged to cooperate with the controller 23 in regulating the connections between the line 19 and a reversible motor 32 provided with oppositely wound field coils 33 and 34 and having upon its shaft a worm 35 adapted to cooperate with a gear 36 mounted on the shaft 31. The setting of the governor 2 and consequently the amount of steam admitted to the turbine 1 is determined by the position of the lever 30 which is connected to the governor through the rod 37 and a bell crank 38 pivoted at the point 39. A member 40 pivoted at 41 and biased to the illustrated position by a spring 42 is mounted upon the lever 30 and is arranged to support worm 43, gear 44 which may be made to mesh with the gear 36, and a hand wheel 45 for rotating the worm 43 in making fine adjustments of the governor by hand. A stop 46 is provided for arresting the motion of the lever 30 in the full speed position. As indicated in Fig. 2, the controllers 20, 9 and 23 are interlocked by bars 47 and 48 pivoted at points 49 and 50 respectively, and adapted to cooperate with cams 20′, 9′ and 23′ arranged to rotate with controllers 20, 9 and 23 respectively. On the lever 47 is provided a latch 51 pivoted at 52 and biased to the position shown for a purpose to be subsequently explained. A similar latch 53 is provided on the lever 48.

In starting the ship from rest in the ahead direction by pilot house or bridge control, the lever 30 being in a position to admit minimum steam to turbine 1, the reversing controller 9 is moved to "ahead" position, the governor or steam controller is moved to the "Min. steam" position, and the resistance controller 20 is moved to "Res. 1" position thereby connecting the generator 3 to the motor 4. Under these conditions the motor 4 is operated at low speed with the resistors 13 and 14 connected in its secondary circuit. The controller 20 may now be successively moved to the "Res. 2" and "Res. out" positions thereby short circuiting the resistors 13 and 14 and increasing the speed of the motor 4. In raising the propeller speed to a value suitable for maneuvering the ship, the controller 23 may be moved to the "Medium steam" position concurrently with operation of the controller 20 thereby establishing a circuit to the field winding 33 of the pilot motor 32 from the line 19 through interlock 54 mounted on the gear 36, segments 55 and 59 of the controller 23 and segment 26 of the follow-up device 24. Since opposite brushes of the motor 32 are now connected to the ground and a terminal of the field winding 33 respectively, the pilot motor 32 is caused to rotate in a clockwise direction, for example, thus imparting counter-clockwise motion to the lever 30 and gradually changing the setting of the governor 2 and increasing the amount of steam admitted to the turbine 1. When the lever 30 has moved to the "Medium steam" or maneuvering position at which 25 to 60 per cent of full steam is admitted to the turbine 1, depending on the character of the ship, the segment 59 of the controller 23 is disconnected from the segment 26 by movement of the follow-up device 24 and the lever 30 comes to rest. The lever 30 may also be brought to rest at any position intermediate the "Min. steam" and "Medium steam" positions by moving the controller 23 back to "Hold" position as will be obvious from the drawing. To further increase the propeller speed the controller 23 may be moved to full steam position thereby connecting the motor 32 to the line 19 through its segment 58 and otherwise as indicated in connection with the "Medium steam" position. Under these conditions the speed of the turbine 1 is gradually increased until the control circuit is broken at segment 26 of the follow-up device 24 in its upper or full steam position. At any position intermediate "Medium steam" and "Full steam," movement of the lever 30 may be arrested by returning the controller 23 to "Hold" position.

The process of lowering the speed of the ship from full speed ahead is the reverse of that just described and is accomplished through manipulation of the controller 23 which during reverse movement from its "Full steam" position connects the field winding 34 of the motor 32 to the line 19 through segment 25 of the follow-up device 24 and otherwise as will be apparent from what has been said in the preceding paragraph regarding operation of the controller 23.

The controllers 20, 9 and 23 are interlocked to permit the sequence of operation described above as will be obvious from Fig. 2. Thus, assuming these controllers to be operated from rest in a counter-clockwise direction, controller 20 can only be moved from "Off" position when controller 9 is in its "Ahead" or "Back" position, controller 9 can be moved to "Off" position only when controller 20 is in "Off" position, controller 23 can be turned from its "Off" position only when controller 20 is in "Off" position except by raising latch 53, controller 23 can be advanced from its "Medium steam" position only when controller 20 is in its "Res. out" position except by raising latch 51, controller 23 can be moved through its "Min. steam" position to "Off" position only when controller 20 is in "Off" position and controller 20 cannot be moved when controller 23 is in a position in advance of "Medium steam." These interlocks thus prevent connection of the motor to the generator when the turbine is operating at full speed and furthermore preclude operation of the reversing switches when the motor is loaded.

If at any time during operation of the ship from the pilot house it is desired to control the governor 2 from the engine room, the lever 30 is operated by hand thereby disengaging the gear 44 from the gear 36 and operating the interlock 54 to break the circuit interconnecting the controller 32 with the line 19, operation of the interlock 54 being accomplished through a rod 60 and a member 61 pivoted at point 62 on an extension of the lever 30. The interlock 54 is arranged in any well known manner to remain open until closed by hand. Likewise, if it is desired to control the adjustment of the rheostat and the connections of the motor 4 to the generator 3 from the engine room, movement of controller 21 from the "Off" position operates the interlock 22 thereby rendering the pilot house control equipment ineffective.

While I have described the principle of my invention, together with the apparatus which I now consider to represent the best embodiment thereof, I desire to have it understood that the apparatus is only illustrative and that the invention can be carried out by other means.

What I claim as new and desire to secure by Letters Patent of the United States, is:

1. A system of electric ship propulsion wherein an electric generator driven by a prime mover having its speed controlled by a governor is arranged to supply current to a propeller motor provided with means for regulating its speed torque characteristic, comprising remote control means, and control means independent of said remote control means, each of said means being arranged to control the setting of said governor and the adjustment of the speed torque characteristic of said motor from a different part of the ship.

2. A system of electric ship propulsion wherein an alternating current generator driven by a prime mover having its speed controlled by a governor is arranged to supply current to a propeller motor provided with an adjustable rheostat connected to its secondary circuit for regulating its speed comprising remote control means, and control means independent of said remote control means, each of said means being arranged to control the setting of said governor and the adjustment of said rheostat from a different part of the ship, and interlocking means for rendering said remote control means inoperative during the operation of said independent control means.

3. A system of electric ship propulsion wherein an alternating current generator driven by a prime mover having its speed controlled by a governor is arranged to supply current to a propeller motor provided with an adjustable rheostat connected to its secondary circuit for regulating its speed comprising remote control means, and control means independent of said remote control means, each of said means being arranged to control the connection of said generator to said motor and the setting of said governor from a different part of the ship, and interlocking means for rendering said remote control means inoperative during the operation of said independent control means.

4. A system of electric ship propulsion wherein an alternating current generator driven by a prime mover having its speed controlled by a governor is arranged to supply current to a propeller motor provided with an adjustable rheostat connected to its secondary circuit for regulating its speed comprising remote control means, and control means independent of said remote control means, each of said means being arranged to control the connection of said generator to said motor and the adjustment of said rheostat from different parts of the ship, and interlocking means for rendering said remote control means inoperative during the operation of said independent control means.

5. A system of electric ship propulsion wherein an electric generator driven by a prime mover having its speed controlled by a governor is arranged to supply current to a propeller motor, comprising direct control means, and remote control means, each of said means being arranged to control the setting of said governor from a different place in the ship, and means operable in response to movement of said direct control means for rendering said remote control means inoperative during the operation of said direct control means.

6. A system of electric ship propulsion wherein an electric generator driven by a prime mover having its speed controlled by a governor is arranged to supply current to a propeller motor provided with an adjustable rheostat for regulating its speed comprising remote control means including a controller for regulating the setting of said governor and controllers for regulating the adjustment of said rheostat and reversing the phase rotation between said generator and said motor, and means for locking said resistance controller against movement when said reversing controller is in any inoperative position and when said governor controller is in a position to admit an amount of steam in excess of that suitable for maneuvering the ship.

7. A system of electric ship propulsion wherein an electric generator driven by a prime mover having its speed controlled by a governor is arranged to supply current to a propeller motor provided with an adjustable rheostat for regulating its speed comprising remote control means including a controller for regulating the setting of said governor and controllers for regulating the adjustment of said rheostat and reversing the phase rotation between said generator and said motor, means for locking said governor controller against movement from its off position to maneuvering position when said resistance controller is in a position to introduce said resistor into the secondary circuit of said motor, and means for rendering said locking means inoperative.

8. A system of electric ship propulsion wherein an electric generator driven by a prime mover having its speed controlled by a governor is arranged to supply current to a propeller motor provided with an adjustable rheostat for regulating its speed comprising remote control means including a controller for regulating the setting of said governor and controllers for regulating the adjustment of said rheostat and reversing the phase rotation between said generator and said motor, and means for locking said resistance controller against movement from its off position when said governor controller is in a position to admit an amount of steam in excess of that suitable for maneuvering the ship.

9. A system of electric ship propulsion wherein an electric generator driven by a prime mover having its speed controlled by a governor is arranged to supply current to a propeller motor provided with an adjustable rheostat for regulating its speed comprising remote control means including a controller for regulating the setting of said governor and controllers for regulating the adjustment of said rheostat and reversing the phase rotation between said generator and said motor, means for locking said governor controller against movement to its off position when said resistance and reversing controller is in any operative position, control means located in a different part of the ship from and independent of said remote control means for regulating the setting of said governor and the connection of said generator to said motor and the adjustment of said rheostat, and means for rendering said remote control means inoperative when said independent control means is in any operative position.

In witness whereof, I have hereunto set my hand this 25th day of July 1923.

RAY STEARNS.